United States Patent [19]

Vander Horst

[11] Patent Number: 4,522,153
[45] Date of Patent: Jun. 11, 1985

[54] TRAINING AND CONTROL LEASH

[76] Inventor: Charles Vander Horst, 916 S. Reynolds Rd., Lot 137, Toledo, Ohio 43615

[21] Appl. No.: 644,935

[22] Filed: Aug. 27, 1984

[51] Int. Cl.³ .............................................. A01K 27/00
[52] U.S. Cl. ..................................................... 119/109
[58] Field of Search ................. 119/109, 96, 117, 118; 54/71

[56] References Cited

U.S. PATENT DOCUMENTS

| | | | |
|---|---|---|---|
| 2,275,701 | 3/1942 | Taylor | 119/109 |
| 2,337,970 | 12/1943 | Cassell | 119/109 |
| 4,186,688 | 2/1980 | Gaitan | 119/96 |
| 4,214,382 | 7/1980 | Matsutani | 119/96 X |

Primary Examiner—Robert P. Swiatek
Attorney, Agent, or Firm—Jos. R. Scalzo

[57] ABSTRACT

The present invention relates to a much needed and desired adjustable and flexible training and control leash for all stages of training and control of animals of all sizes and particularly dogs. It provides safety and assurance and a wide range of comfort and flexibility for both dog or animal, trainer and master. The present invention consists essentially of a telescopic training and control rod with a specially designed swivel connection that by predetermined sizing of the aperture, bolt connection and swivel ball can predetermine the maximum permitted flexibility, lateral and circular movement of the dog or animal and by the simple means of turning a thumb nut can limit this flexibility to any range desired and necessary between maximum flexibility and no flexibility as the conditions and objectives warrant.

8 Claims, 6 Drawing Figures

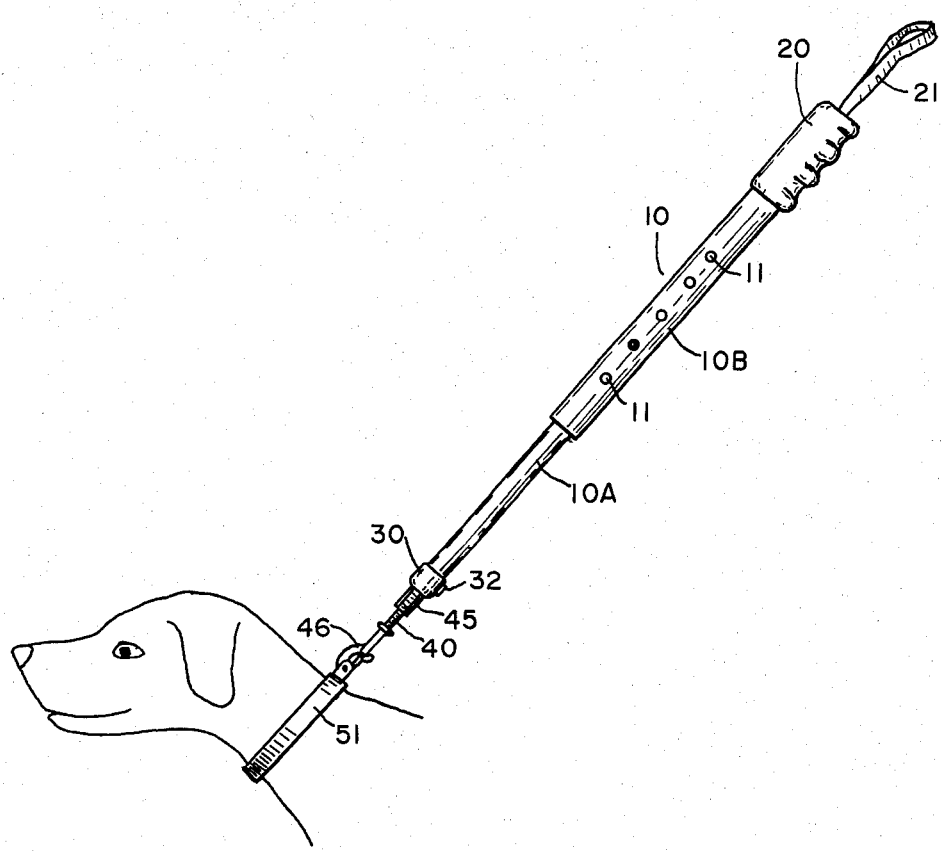
Fig I
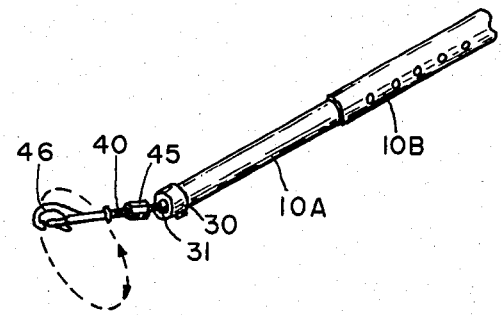
Fig II
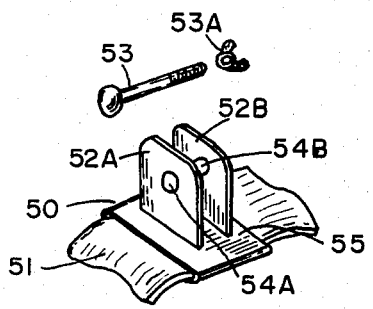
Fig III

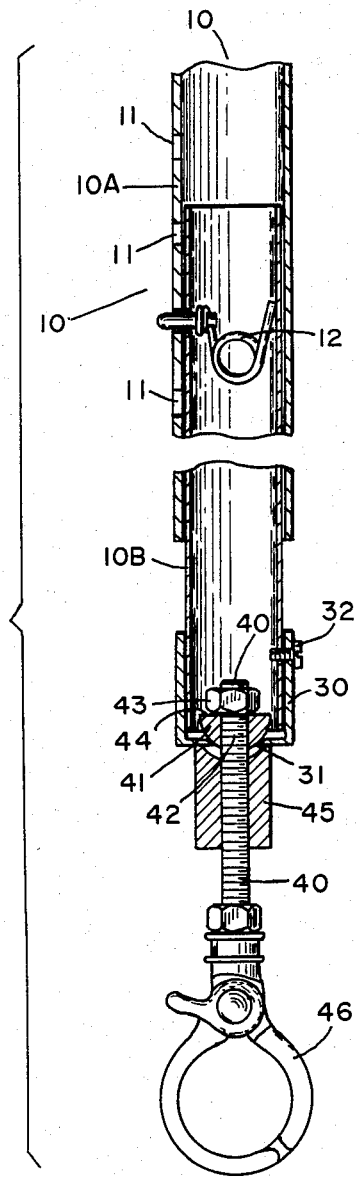
Fig IV
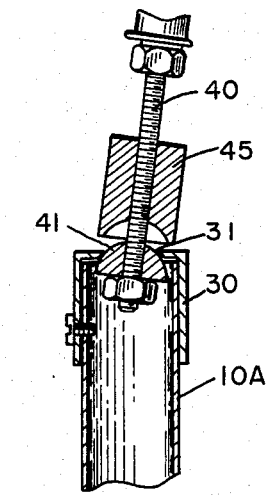
Fig VI
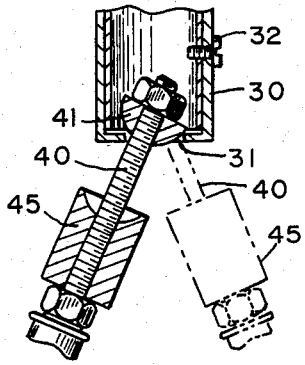
Fig V

TRAINING AND CONTROL LEASH

DESCRIPTION

The novel and useful training walking and control leash disclosed herein is a long desired and needed innovation in the training, walking and controlling of particularly dogs, and at the same time equally practical and perhaps more useful and necessary in the training walking and controlling of even larger domestic animals such as cows, bulls or horses.

The device of the present invention can be made in any necessary and useful size, strength and flexibility for the service required from a small dog to a large horse or bull. However, for the greatest anticipated usage; namely, dogs of all sizes and for practically every "master-dog" use and relationship, the invention described herein will more specifically relate to dog training and control leashes.

A dog and his trainer or master form a communicating team utilizing dimensions bordering on the psychic as well as physical; such as sound, sight, taste, smell and as in the case of a training and control leash, feel and touch.

As is the case with all animals, humans cannot completely depend on the four senses that eliminate final and positive, ultimate control by the human and therefore, the most dependable control sense becomes that of positive feel, touch as conveyed by and with a training and control leash of the present invention.

Safety for both dog and master dictates that a leash be sturdy and long enough to dependably keep a dog or animal at arms length to prevent unexpected, unwanted or unnecessary physical contact between the two.

Humanity dictates that a leash must give a range of comfortable movement to a dog that is both comfortable and non-injurious, and yet with prescribed predetermined circumstances and limits to insure positive control by the master at all times. To a blind person, rigged control with minimum flexibility may be most practical. The present leash permits this. To a master on a spirited walk, a large degree of flexibility and movement may be desired. This the present leash will permit. On the other hand a trainer or master may require varying degrees of flexibility and movement depending on the training objective. The wide range of adjustability and flexibility required in all these cases can best be realized through the incorporation of the principles utilized in perfecting what has been referred to as an ideal dog leash for all seasons and reasons as in the present invention.

Now referring to the accompanying drawings:

FIG. I is a side elevation view of a telescopic training and control leash in a locked or rigged control position.

FIG. II is a partial side elevation view of the same training and control leash in its unlocked or maximum flexibility position.

FIG. III is a partial perspective view of a dog collar connecting piece for receiving the clamp means provided on the training and control leash.

FIG. IV is a partial cut away view through the center of a telescopic training and control leash.

FIG. V is a partial cut away view of the cap and swivel connecting piece and adjustable thumb nut illustrating the maximum range of flexibility permitted, and FIG. VI is a partial cut away view of the cap and swivel connecting piece with the adjustable thumb nut in a partially closed position.

In essence the present all purpose and dependable training and control leash consists essentially of a rugged and sturdy telescopic control rod (10) the length of which is adjustable within a wide and necessary range to accomodate both the dog and his master as well as the objective sought. A handle grip (20) with an attached wrist strap (21) for further gripping and holding is provided as an integral part of the adjustable control rod.

A specially designed adjustable swivel connection piece is provided at the opposite end of the control rod from the handle grip (20) and wrist strap (21). This specially designed adjustable swivel connection piece is specifically designed to permit a wide range of controlled, comfortable and flexible movement in all directions of head and neck movement of any size dog or animal. The amount of movement permitted or desired can be controlled and can range from considerable to none depending on the master's objectives and requirements at the time. This adjustable swivel connection is accomplished by the use of a specially designed combination of a semi-spherical ball (41) flat on its upper surface (44) with a threaded bolt (40) connected to it and extending through and from the exact spherical center of the ball (41). The threaded bolt (40) extends downward through a circular aperture (31) in the bottom capped portion (30) of the control rod (10). The aperture diameter (31) being substantially larger than the diameter of the threaded bolt (40) to permit a predetermined amount of lateral and circular movement of the threaded bolt (40), however, the diameter of the aperture (31) is substantially smaller than the diameter of the semi-spherical ball (41) to retain the ball (41) within the cap (30), and the aperture (31) is bevelled on its periphery within the cap (30) to permit a smooth seating and swivel of the semi-spherical ball which will protrude slightly through the aperture (31).

The opposite end of the threaded bolt (40) from the swivel ball (41) is connected to a removable collar clamp (46) for attaching to a dog's collar (51). Disposed between the clamp (46) and the underside of the cap aperture (31) and screw fitted to the threaded bolt (40) is the adjustable thumb screw (45). When the thumb screw (45) is tightened against the aperture (31) and the small portion of the semi-spherical ball (41) extending through it, there is no swivel or flexibility permitted by the control rod (10) and its swivel connection. By loosening the adjustable thumb nut (45) a predetermined degree of swivel and movement is permitted depending on the extent to which the adjustable thumb nut (45) is loosened. By loosening the adjustable thumb nut (45) completely, the maximum swivel, flexibility and movement is permitted which is limited and predetermined by the selected length of the threaded bolt (40) and the relative diameter of the aperture (31) to the diameter of the threaded bolt (40). In this way a controlled adjustable and predetermined as well as predesigned range of flexibility is positively determined and controlled by design.

By the simple coordination of the diameter of the cap aperture (31) and the lesser diameter of the threaded bolt (40), the maximum lateral and circular flexibility and movement at the clamp end of the threaded bolt can be predetermined by design. Normally and generally the most useful ratio of bolt diameter (40) to aperture diameter (31) is in the range of 1 to 2. It becomes obvious then that lengthening or shortening the length of the bolt (40) between the cap (30) and the clamp (46) will vary the maximum length of the diameter of circular movement permitted by a dog's head and neck, which maximum movement can then be decreased by the tightening of the thumb nut (45) on the threaded bolt (40) to restrict this movement.

It is understood that the preferred embodiment envisions a hollow cap (30) diameter great enough so that the swivel bolt (41) and nut (43) connection will not contact the sides of the hollow cap (30) in order not to restrict maximum flexibility of the swivel ball.

In the preferred embodiment the telescopic control rod (10) consists of two hollow slideably tubular fitted sections (10A) and (10B) with holes (11) spaced vertically along one side of each of sections (10A) and (10B) to be locked together by a screw means (not shown) or a releaseable spring means (12) as shown in FIG. IV. The length of the telescopic control rod (10) then becomes adjustable by moving section 10A of the control rod (10) within upper section (10B) and aligning the vertical holes (11) and the spring or screw locking means (12) to provide the desired length of control rod (10).

In order to securely and comfortably attach the control rod (10) and its clamp (46) to the collar (51) of a dog, any number of suitable collar clamps are available and in use. However, one such collar clamp (50) is shown in FIG. III for illustrative purposes and consists of a collar strap (51) surrounded by a collar clamp base (55) with two vertical flanges (52A) and (52B) having apertures (54A) and (54B) through which a threaded bolt (53) will pass and locked in place by a nut (53A). The removeable clamp means (46) of the present invention then would clamp around the collar bolt (53) between the two flanges (52A) and (52B).

Having thus described the present invention in its preferred embodiment, it is possible that variations can be made in the design within the purview of this invention, such as the swivel ball (41) may be entirely or only partially spherical or rounded, and the bolt (40) may be slideable or rigidly attached to the swivel ball (41), and that the diameters and dimensions of the ball (41), the aperture (31) and the bolt (40) and the hollow cap (30) as well as the length of the bolt (40) may be varied to give a wider or narrower range of maximum flexibility, however, always keeping in mind that the predetermined relationship of these variables, one to the other, is in the end controlling and within the purview of this invention.

What is now claimed is:

1. A training and control leash comprising a rigid control rod;
   a removable hollow cap surrounding the bottom end portion of said control rod and said removable cap being provided with a circular aperture opening central of its bottom cover;
   an elongated threaded bolt of less diameter than the diameter of said aperture extending partially within said removable cap;
   a swivel ball piece disposed within said removable, hollow cap and provided with a smooth hollow cylindrical opening throughout its center through which the upper end portion of said threaded bolt protrudes;
   a threaded nut screwed on the upper protruding end portion of said threaded bolt to retain said swivel ball on said threaded bolt and within said hollow cap;
   a removable collar clamp means secured to the lower end portion of said threaded bolt for removably clamping said threaded bolt and said control rod to a dog collar;
   an adjustable threaded thumb nut screwed on to said threaded bolt between said collar clamp means and said hollow cap in order to adjust by screwing means the extent of swivel desired in the control of a dog or animal being controlled.

2. A training and control leash as set forth in claim 1 with the periphery of said aperture in said hollow cap being bevelled to receive said swivel ball and said swivel ball diameter being greater than the diameter of said aperture in said hollow cap and thus protruding slightly through said aperture, and said threaded thumb nut on said threaded bolt being bevelled on its top surface to match and receive the protruding portion through said aperture of said swivel ball when screwed against said swivel ball.

3. A training and control leash as set forth in claim 1 having a handle grip on the top portion of said control rod for gripping means and a wrist strap connected to said control rod for additional holding means.

4. A training and control leash as set forth in claim 1 having said control rod telescopically adjustable and comprising two cylindrical hollow tubes, one slideably fitting within the other and a series of vertically spaced holes on one side of each of said cylindrical hollow tubes and a spring or screw holding means for adjusting the length of said control rod by means of aligning the respective holes in each tube to receive said spring or screw holding means.

5. A training and control leash as set forth in claim 1 having said swivel ball consisting of a semi-spherical ball with a flat upper surface and said threaded nut screwed on to said threaded bolt extending from said flat surface of said semi-spherical ball.

6. A training and control rod compressing:
   a telescopically adjustable hollow control rod consisting of two hollow cylindrical tubes, one slideably fitting within the other;
   a series of vertically spaced holes on one side of each of said cylindrical tubes;
   a spring or screw locking means within one of said cylindrical tubes for adjusting the length of said control rod by means of aligning the respective holes in each tube to receive said spring or screw locking means;
   a handle grip provided with a wrist strap secured to the top end portion of said control rod;
   a removable hollow cap secured to the bottom end portion of said control rod, said removable hollow cap having a circular aperture in its center, and said aperture being bevelled around its upper periphery facing inwardly of said hollow control rod;
   a threaded bolt extension extending partially through said aperture into said removeable cap and the diameter of said bolt being less than the diameter of said aperture and said bolt extending both within and without said hollow cap;
   a semi-spherical swivel ball disposed around the upper portion of said threaded bolt within said cap, said semi-spherical swivel ball having a flat surface on one side and a hollow central cylindrical smooth opening throughout and central of said flat surface and extending completely through said swivel ball to receive said threaded bolt, said semi-spherical ball having a diameter greater than the diameter of said cap aperture so that a portion of said semi-spherical swivel ball protrudes through said cap aperture;

a threaded nut screwed on to the end portion of said threaded nut immediately above said flat surface of said semi-spherical swivel ball within said hollow cap;

a removable clamping means attached to the bottom end portion of said threaded bolt to clamp on a collar of a dog or animal;

an adjustable threaded thumb nut screwed on to said threaded bolt and positioned between said removable cap and said collar clamp means in order to adjust by screwing means the extent of the swivel desired in the control of a dog or animal to be controlled, and said thumb nut having a bevelled portion on its top surface to match and receive the protruding portion of said semi-spherical swivel ball through said cap aperture.

7. A training and control leash as set forth in claim 1 having said threaded bolt permanently secured to said swivel ball, and said swivel ball being spherical on at least its bottom swivel ball portion.

8. A training and control leash as set forth in claim 7 having said bolt permanently secured to said swivel ball and said swivel ball being spherical on at least its bottom swivel ball portion.

* * * * *